United States Patent [19]

Rumbaugh et al.

[11] Patent Number: 5,015,057

[45] Date of Patent: May 14, 1991

[54] LIQUID CRYSTAL FIBER OPTIC ATTENUATOR AND PROCESS FOR MAKING SAME

[75] Inventors: Scott H. Rumbaugh, Lake Oswego; Michael D. Jones, Portland; Friedrich Scheu, Bend; Philip J. Bos, Beaverton, all of Oreg.

[73] Assignee: Tektronix, Inc., Beaverton, Oreg.

[21] Appl. No.: 410,565

[22] Filed: Sep. 21, 1989

[51] Int. Cl.$^5$ ............ G02B 6/26; C09K 19/00; C09K 19/52; G02F 1/13

[52] U.S. Cl. ............ 350/96.15; 350/96.18; 350/96.20; 350/320; 350/347 V; 350/350 R; 428/1; 252/299.01; 252/589

[58] Field of Search ............ 350/96.15, 96.20, 96.16, 350/96.18, 311, 312, 355, 356, 347 V, 331 T, 339 F, 340, 350 R, 351, 320; 428/1; 252/299.01, 582, 588, 589

[56] References Cited

U.S. PATENT DOCUMENTS

| | | | |
|---|---|---|---|
| 4,364,639 | 12/1982 | Sinclair et al. | 350/96.15 X |
| 4,435,047 | 3/1984 | Fergason | 350/334 |
| 4,606,611 | 8/1986 | Fergason | 350/334 |
| 4,616,903 | 10/1986 | Fergason | 350/334 |
| 4,685,771 | 8/1987 | West et al. | 350/347 V |
| 4,768,864 | 9/1988 | Wu et al. | 350/351 |
| 4,775,226 | 10/1988 | Montgomery, Jr. et al. | 350/351 |
| 4,810,063 | 3/1989 | Fergason | 350/347 V |
| 4,815,805 | 3/1989 | Levinson et al. | 350/96.16 |
| 4,818,070 | 4/1989 | Gunjima et al. | 350/347 V |
| 4,890,902 | 1/1990 | Doane et al. | 350/347 V |
| 4,938,568 | 7/1990 | Margerum et al. | 350/347 V X |

OTHER PUBLICATIONS

Eric G. Hanson, "Polarization-Independent Liquid Crystal Optical Attenuator for Fiber-Optics Applications", Applied Optics, vol. 21, No. 7, 1342 (1982).

J. W. Doane et al., "Field Controlled Light Scattering from Nematic Microdroplets", Appl. Phys. Lett. 48, 269, (1986).

Primary Examiner—Brian Healy
Attorney, Agent, or Firm—John D. Winkelman; Paul S. Angello

[57] ABSTRACT

A polarization insensitive optical attenuator (10,40) uses a polymer-dispersed liquid crystal (PDLC) film (14,56) to provide attenuation control over a wide range of attenuation values. The attenuator has a relatively low minimum attenuation and reliable light transmission with minimal insertion loss. The present invention is also adaptable for use with a temperature controller (200) that stabilizes the PDLC film, which promotes more uniform, predictable attenuation values.

23 Claims, 5 Drawing Sheets

LIQUID CRYSTAL FIBER OPTIC ATTENUATOR AND PROCESS FOR MAKING SAME

TECHNICAL FIELD

The present invention relates to optical attenuators and, in particular, to a readily manufacturable liquid crystal optical attenuator that is suitable for use in an optical fiber system.

BACKGROUND OF THE INVENTION

Optical attenuators are currently employed in optical test and measurement instrumentation and optical communication systems. The following background information is presented herein only by way of example with reference to an optical attenuator that is suitable for use in an optical fiber communication system. One type of conventional optical fiber communication system employs an optical fiber that transmits a light beam emitted by a semiconductor laser having narrow spectral linewidth characteristics. The light beam propagates through the optical fiber and strikes a light detector at an intensity or power level that occasionally oversaturates the detector and thereby causes a loss of information carried by the light beam.

Detector oversaturation can occur as a consequence of changes in the number of local area network users. Such changes cause variations in the light beam intensity received by the detector and sometimes result in information loss. To solve this problem, an optical attenuator may be used to vary the intensity of the light beam to a level within the operational range of the detector, preferably without undesirable variations in the spatial, temporal, spectral, or polarization distribution of the light beam.

Commercially available optical attenuators typically use either mechanical or nonmechanical devices to reduce the light beam intensity. One type of mechanical optical attenuator positions an object to obstruct the path of an expanded light beam. Such objects include, for example, neutral density filters or circularly graded half-silvered mirrors that are moveable or rotatable into and out of the beam path. Another type of mechanical attenuator moves a prism made of absorbing material within the beam path to vary the optical path length within the absorbing medium to increase its absorptive capacity. Because of their complexity, mechanical optical attenuators of the above-described types are costly, do not offer reliable precision control, and often increase the end separation or the transverse offset of a fiber splice. Increased end separation and transverse offset cause light loss, and may thereby cause information loss when the light beam is detected.

Nonmechanical optical attenuators may be as complex and costly as mechanical attenuators and often require additional light beam polarization control devices. One type of nonmechanical optical attenuator that includes electrooptical cells is described in Hanson "Polarization-Independent Liquid Crystal Optical Attenuator for Fiber-Optics Applications," *Applied Optics*, Vol. 21, No. 7, 1342 (1982). The attenuator uses a twisted nematic liquid crystal cell across which a variable voltage is applied to change the polarization state of an input beam. The cell is positioned between two planar calcite displacement prisms in an assembly that is placed in front of an optical fiber. The assembly splits the input beam into components that are either directed to or away from the optical fiber, depending on the voltage applied across the cell. The applied voltage affects the polarization states and, therefore, the directions of the beam components propagating through the cell. The attenuator is costly and very difficult to align.

One problem associated with a twisted nematic liquid crystal cell is its dependence on polarization devices, which can be a severe limitation because the state of polarization of a light beam in an optical fiber is generally unknown and often changes in response to thermal or mechanical stresses or inherent birefringence in the fiber. However, microdroplet-containing liquid crystal films offer light scattering properties that are potentially useful in an optical attenuator. A liquid crystal microdroplet film is a transparent, solid matrix containing generally spherically-shaped microdroplets of substantially pure nematic liquid crystal material. Such a film may be made, for example, from polymer-dispersed liquid crystal (PDLC) or latex microencapsulated liquid crystal material.

Whenever no voltage is applied across a PDLC film (i.e., the "OFF state"), the liquid crystal molecules randomly align and develop a mismatch between the solid polymer matrix index of refraction, $n_p$, and the effective index of refraction of the liquid crystal microdroplets, $n_d$, thereby strongly scattering light incident to the film. The value of $n_d$ depends on the orientation and ordering of the liquid crystal molecules in the microdroplets. Whenever a voltage of sufficient magnitude is applied across a PDLC film (i.e., the "ON state"), the liquid crystal molecules align parallel to the field and change the value of $n_d$ to approach that of $n_p$, thereby causing the film to become transparent. The size and distribution of the microdroplets can be adjusted to change the transmissivity of the film in the OFF state, in a manner more fully described by J. W. Doane et al., "Field Controlled Light Scattering from Nematic Microdroplets," *Appl. Phys. Lett.* 48, 269 (1986).

The shape or geometry of microdroplets in liquid crystal microdroplet films is of interest because the shape of the microdroplets largely determines the attenuation capability of the films. For example, relaxation response time performance can be reduced and OFF state scattering characteristics can be improved for liquid crystal microdroplet films if the microdroplets are formed such that they have oblate-spheroid or disk-shape and have their maximum cross-sectional areas disposed perpendicular to the direction of light propagation. Oblate-spheroid microdroplets increase the restoring forces on central molecules to allow the cell to relax into the OFF state more rapidly. Whenever the film is in the OFF state, light will be more strongly scattered by each microdroplet because the average molecular ordering is more nearly perpendicular to the direction of light beam propagation and the effective refractive indices of the microdroplets are mismatched by a greater degree with respect to the index of refraction of the polymer matrix. The oblate-spheroid microdroplet geometry also provides liquid crystal microdroplet films with more predictable, constant optical performance over time.

The microdroplet geometry in the films can be affected by applying external pressure during film polymerization. For example, substrate surface adhesion techniques or electric or magnetic fields can be used to affect the shape of the microdroplets. Specifically, a liquid crystal film undergoes net expansion during curing because the mixture of matrix material has a higher coefficient of thermal expansion than that of a glass substrate on which the film is supported. During cooling, the film contracts only in the direction perpendicular to the glass substrate because the film adheres to the glass substrate surface and, therefore, does not contract in the direction tangential to the surface. The resulting liquid crystal film has oblate-spheroid microdroplets.

The optical performance of liquid crystal microdroplet films also may be enhanced by certain techniques carried out during the curing step of the liquid crystal microdroplet film preparation. An improperly cured liquid crystal microdroplet film can have contaminant polymer precursors solidified within the microdroplets. A post curing step generally increases the purification of the liquid crystal material in the microdroplets, thereby decreasing the number of contaminant polymer precursors and increasing the dynamic attenuation range of the film.

SUMMARY OF THE INVENTION

An object of the present invention is, therefore, to provide a nonmechanical, polarization insensitive optical attenuator for modulating the intensity of a light beam.

Another object of this invention is to provide such an attenuator of relatively small size and low cost and configured to function within an optical fiber communication system.

A further object of this invention is to provide a technique for forming oblate-spheroid liquid crystal microdroplets having their maximum cross-sectional areas disposed perpendicular to an optical path into a film configured to provide reliable attenuation for such a compact attenuator.

The present invention is a compact, polarization insensitive optical attenuator that uses a PDLC film to provide attenuation control over a wide range of attenuation values. The present invention also includes an attenuator construction method that secures surfaces adjacent the PDLC film against pulling unpredictably during film polymerization, but allows for film contraction during cooling so that oblate-spheroid microdroplets will form. The attenuators described herein have relatively low minimum attenuation values and reliable light transmission characteristics with minimal insertion losses resulting from end separation and transverse offset effects. The present invention is also adaptable for use with a temperature controllable PDLC film, which promotes more uniform, predictable attenuation values.

The operating temperature of the PDLC film can influence the microdroplet geometry and thereby affect the relaxation response time and dynamic attenuation range of the attenuator. The relaxation response time decreases with decreasing film temperature, and the attenuation range decreases with increasing film temperature. The temperature controller maintains the operating temperature of the PDLC film at a constant value to make the optical performance of the attenuator more predictable. The attenuator of the present invention exhibits superior optical performance in the temperature range of between 25° C. and 30° C.

Additional objects and advantages of the present invention will be apparent from the following detailed description of preferred embodiments thereof, which proceeds with reference to the accompanying drawings.

DETAILED DESCRIPTION OF PREFERRED EMBODIMENTS

Figure 1:
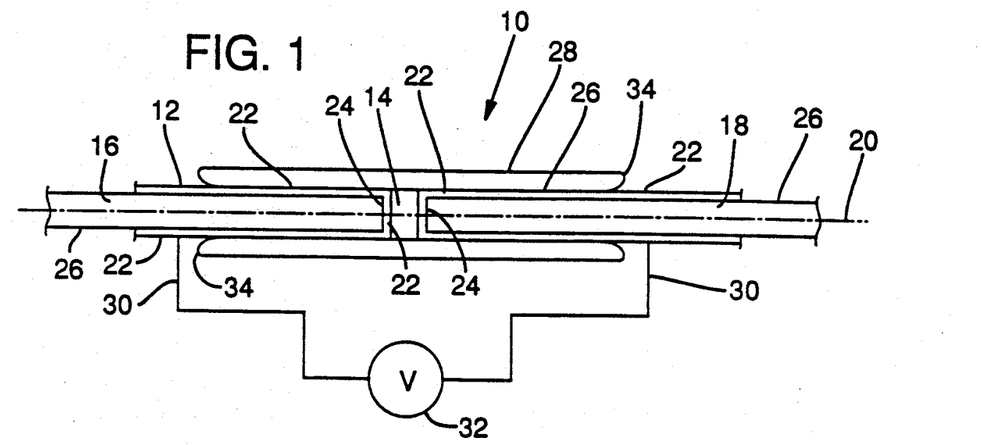
FIG. 1 is a schematic diagram of a first preferred embodiment of a liquid crystal attenuator of the present invention, which is shown spliced into an optical fiber.

FIG. 1 is a schematic diagram of a liquid crystal attenuator 10, which constitutes a first preferred embodiment of the present invention and is shown spliced into an optical fiber 12. Attenuator 10 includes a liquid crystal film 14 set between two adjacent sections 16 and 18 of optical fiber 12 that defines an optical path 20. Film 14 is preferably composed of a layer of PDLC, which is about 0.0762 mm in thickness.

A thin, optically transparent electrically conductive coating 22, of preferably indium tin oxide (ITO), is applied to ends 24 of sections 16 and 18 of fiber 12. Coating 22 may also extend along the exterior surfaces 26 of sections 16 and 18, which are covered by a capillary tube 28 of about 1.0 cm in length. Capillary tube 28 serves to encase and secure film 14 to sections 16 and 18 of fiber 12. A pair of electrodes 30 attached to a voltage source 32 are electrically connected to exposed portions of coating 22 extending along the exterior surfaces of sections 16 and 18 from ends 34 of capillary tube 28 by an electrically conductive paint.

Figure 2:
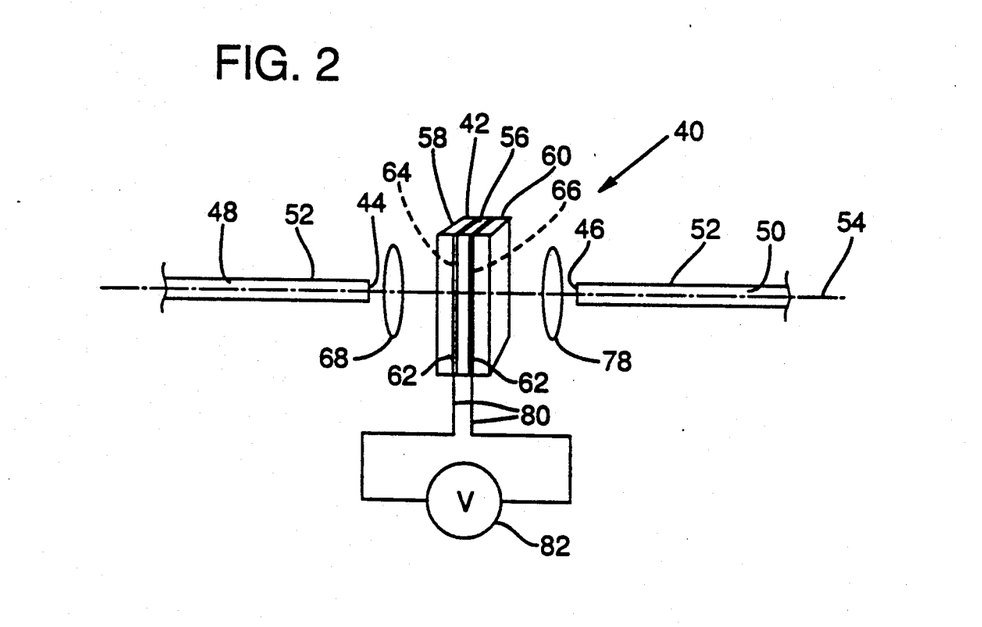
FIG. 2 is a schematic diagram of a second preferred embodiment of the liquid crystal attenuator of the present invention, which is shown placed within an expanded beam fiber optic connector.

FIG. 2 is a schematic diagram of an alternative liquid crystal attenuator 40, which constitutes a second preferred embodiment of the present invention. Attenuator 40 includes a liquid crystal cell 42 disposed between ends 44 and 46 of sections 48 and 50, respectively, of an optical fiber 52 that defines an optical path 54 along which a light beam travels. Cell 42 includes a film 56 of PDLC material captured between two transparent plates 58 and 60 that are covered with thin, optically transparent conductive coatings 62 of ITO on their inner surfaces 64 and 66, respectively. A collimating lens 68 positioned between end 44 of section 48 and transparent plate 58 of cell 42 expands and collimates the light beam traveling along optical path 54 and exiting section 48 of optical fiber 52.

The collimated beam passes through and exits cell 42. A portion of the collimated beam exiting cell 42 strikes a converging lens 78 that is positioned between end 46 of section 50 and transparent plate 60 of cell 42. Lens 78 focuses the light so that it enters end 46 of section 50 of optical fiber 52. A pair of electrodes 80 attached to a voltage source 82 are electrically connected to different ones of the ITO covered plates 58 and 60 by an electrically conductive paint.

Liquid crystal films 14 and 56 are made in accordance with a polymerization-induced phase separation technique. The preferred films include a nematic liquid crystal material, a mixture of polymer precursors, and a refractive index adjusting additive.

A liquid crystal material commonly used in PDLC films is product number E-7, manufactured by BDH Chemicals Ltd. of Poole, England. The E-7 material has an ordinary refractive index, $n_o = 1.51$, and an extraordinary refractive index, $n_e = 1.74$.

Polymer precursors are used to form a solid, clear, optically isotropic material. A preferred precursor is a mixture of Epon 828 and Capcure 3-800 having a refractive index of 1.554. The refractive index adjusting additive is used to match the refractive index of the polymer precursors with the ordinary refractive index, $n_o$, of the liquid crystal material. A preferred adjusting additive is cyclohexanedimethanol diglycidyl ether, which is sold under the tradename MK 107 and has a refractive index of 1.506. The preferred PDLC film contains the liquid crystal material, the polymer precursors, and the index adjusting additive in the amounts set forth in the table below.

| Material Type | Amount (Weight %) |
| --- | --- |
| E-7 | 41.0% |
| Epon 828 | 9.8% |
| Capcure 3-800 | 30.9% |
| MK 107 | 18.3% |

The preferred PDLC film is made by sequentially adding and blending the film components to ensure a substantially even distribution of microdroplets in the film and to reduce undesirable topographical effects. The Epon 828, MK 107, and E7 materials are thoroughly blended together before the Capcure 3-800 is added. The material is blended again and de-gassed. The mixture is then blended and deposited between two sections of a fiber or between parallel plates. Curing is typically performed at 70°-72° C. to obtain microdroplets from 0.002 mm to 0.005 mm in size. The films are generally post cured at 90° C. for 3-5 hours.

The preferred thickness of film 14 in attenuator 10 is about 0.0762 mm. Even though dynamic range of attenuation increases with increased thickness of the PDLC film, substantial losses in maximum transmission can occur for thickness greater than 0.0889 mm.

It will be appreciated that other phase separation techniques such as solvent induced or thermally induced phase separation and other liquid crystal materials, polymer precursors, and refractive index adjusting additives may be used without significantly departing from the scope of the present invention.

The liquid crystal film 14 of attenuator 10 entails the use of the following method to produce oblatespheroid microdroplets. If fiber sections 16 and 18 are not restrained during the curing procedure, the thickness of film 14 is uncontrolled so that each resulting attenuator 10 will provide inconsistent attenuation over its light-receiving surface. However, if fiber sections 16 and 18 are strongly secured to capillary tube 28, film 14 will be unable to contract in the direction of the optical path 20 during curing and the resulting microdroplets will not form proper oblate-spheroids. These problems can, however, be prevented by placing a drop of UV epoxy into ends 34 of capillary tube 28 and exposing the epoxy for about one-third of its full curing time to partially secure the fiber sections. This procedure allows the film to contract sufficiently to properly alter the shape of the microdroplets but also restrains the fiber sections from large displacements, thereby determining the thickness of film 14 and minimizing displacement problems such as inconsistent attenuation.

Attenuator 10 exhibits greater dynamic range of attenuation when the ends 24 of section 16 and 18 fiber 12 are prepared in the following manner. Fiber sections 16 and 18 are stripped of about 25.4 mm of the casing from their ends 24. The ITO coating 22 of approximately 450A is deposited on ends 24 and exterior surfaces 26 of sections 16 and 18. It is noted that the ITO coating 22 may be applied to the surfaces 26 in strips and need not cover the entire surfaces. Coating 22 is then subjected to a five-hour baking process that includes a one hour baking cycle at 400° C. preceded and followed by respective two-hour gradual temperature ramp-up and ramp-down cycles. The two-hour temperature ramp cycles prevent fiber brittleness and destruction of the coating.

Attenuator 10 is assembled in the following preferred order. After the fiber sections have been prepared, fiber section 16 is inserted nearly halfway into capillary tube 28 and unpolymerized liquid crystal film mixture is deposited onto end 24. Fiber section 18 is then inserted into capillary tube 28 so that the end 24 of section 18 contacts the unpolymerized liquid crystal film mixture. The drops of UV epoxy are placed so that they each contact one end 34 of capillary tube 28 and a fiber section. It will be noted that the UV epoxy may be applied to exterior surfaces 26 before the fiber sections are inserted into capillary tube 28. The attenuator 10 assembly is next exposed to UV radiation for partial curing of the UV epoxy and then heated to cure liquid crystal film 14. Film 14 may also be post cured before the UV epoxy is post cured.

Figure 3A:
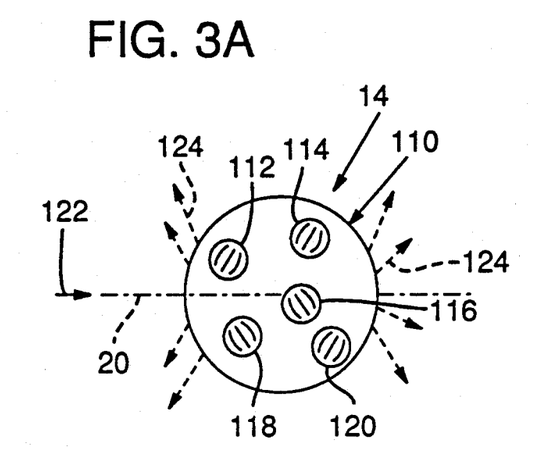
FIGS. 3A and 3B are diagrams showing the light scattering characteristics of microencapsulated liquid crystal molecules in a PDLC film in nonfield-aligned and maximally field-aligned states, respectively.
Figure 3B:
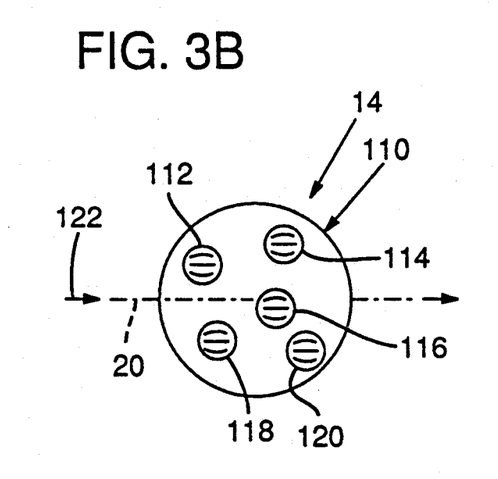

FIG. 3A and 3B are diagrams showing the light scattering characteristics of a cross sectional area 110 of film 14 in its nonfield-aligned and maximally field-aligned states. With reference to FIG. 3A, microdroplets 112, 114, 116, 118, and 120 in area 110 are shown in the OFF state, i.e., when no electric field is applied across film 14. In the OFF state, the liquid crystal molecules in microdroplets 112, 114, 116, 118, and 120 align generally tangentially with respect to the microdroplet walls, the effective refractive indices of the microdroplets are mismatched with respect of the index of refraction of polymer matrix, and light beam 122 propagating along optical path 20 scatters randomly.

With reference to FIG. 3B, microdroplets 112, 114, 116, 118, and 120 in area 110 are shown in the ON state, i.e., when a maximum electric field is applied across film 14 from voltage source 32. In the ON state, the liquid crystal molecules align generally parallel to the electric field, the effective refractive indices of the microdroplets become generally equal to that of the polymer matrix, and light beam 20 propagates through film 14 substantially unscattered.

Figure 4A:
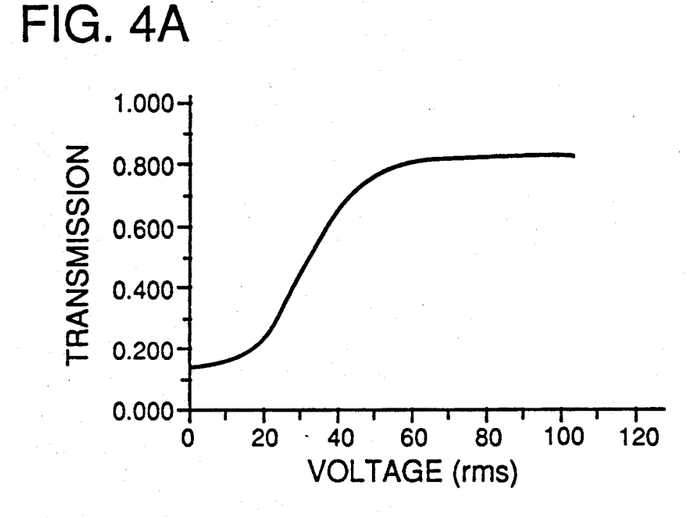
FIGS. 4A and 4B show typical light transmission curves for the attenuators depicted in FIGS. 1 and 2, respectively.
Figure 4B:
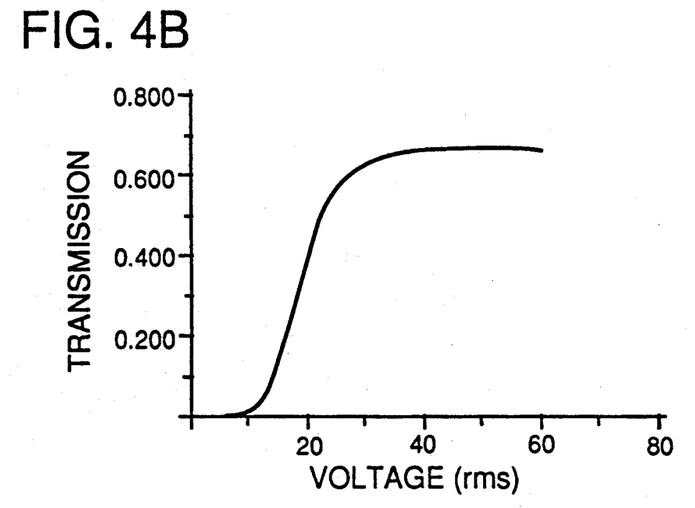

FIGS. 4A and 4B show typical light transmission curves for the attenuator 10 depicted in FIG. 1 and the attenuator 40 depicted in FIG. 2, respectively. The liquid crystal attenuator 10 constructed as described above has demonstrated a dynamic range of better than 8 with an insertion loss of less than 0.7 dB. It will be appreciated that a very efficient attenuation system with a much greater dynamic range could be constructed by connecting several liquid crystal attenuators 10 in optical series.

The liquid crystal attenuator 40 constructed as described above has demonstrated a dynamic range of better than 26 with an insertion loss of less than 1.2 dB. The attenuation range of attenuator 40 can also be controlled by adjusting the distance between the PDLC film 56 and converging lens 78.

Figure 5A:
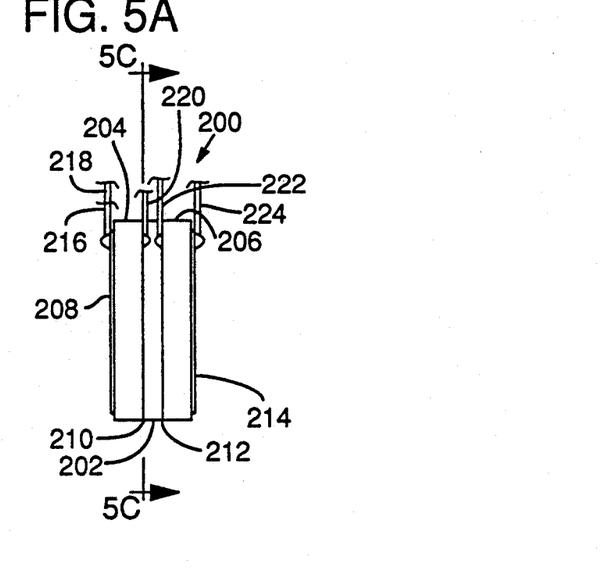
FIG. 5A is a schematic end elevation view of a temperature control system for a liquid crystal attenuator of the type shown in FIG. 2.

FIG. 5A is a schematic diagram of a side view of a temperature control system 200 that keeps the operating temperature of the PDLC film at a constant, uniform value. Temperature control system 200 preferably includes a liquid crystal matrix 202 disposed between two liquid crystal glass disks 204 and 206. A layer of a heat-producing electrically conductive coating is applied to each side of glass disks 204 and 206.

Figure 5B:
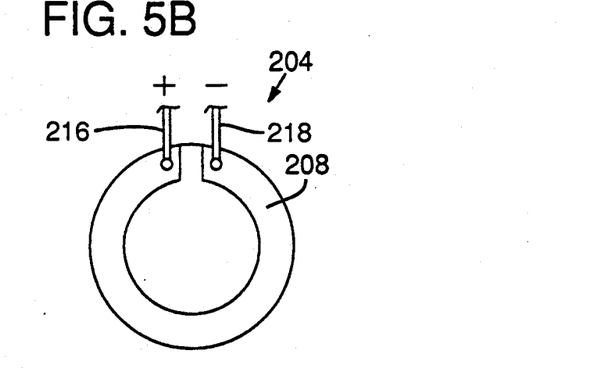
FIG. 5B is a left side elevation view of the temperature control system of FIG. 5A.
Figure 5C:
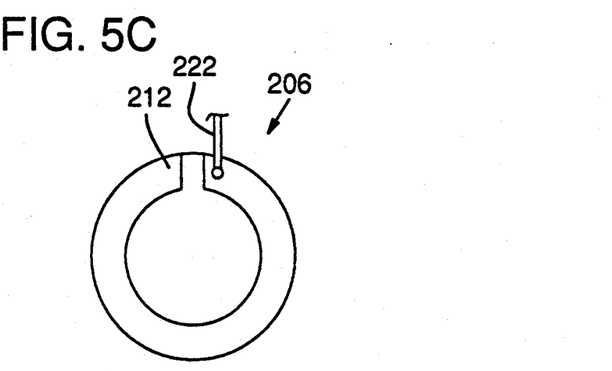
FIG. 5C is a sectional view taken along lines 5C—5C of FIG. 5A.

Glass disk 204 has outer coating 208 and inner coating 210, and glass disk 206 has inner coating 212 and outer coating 214. In the embodiment shown, coatings 208, 210, 212, and 214 resemble circular strips placed along the peripheries of glass disks 204 and 206. Each coating has a break and does not extend around the entire circumference of the sides of glass disks 204 and 206, as shown in FIGS. 5B and 5C. It will be appreciated that the coatings 208, 210, 212, and 214 need not be identically shaped.

FIGS. 5B and 5C show the conductive coatings and electrical leads attached to an outer side of disk 204 and an inner side of disk 206, respectively. Electrical leads 216 and 218 are attached to conductive coating 208. Electrical leads 220, 222, and 224 are attached to conductive coatings 210, 212, and 214 in the manner shown in FIG. 5C for lead 222 and coating 212 on glass disk 206. Conductive coatings 208, 210, 212, and 214 and leads 216, 218, 220, 222, and 224 are attached prior to assembly of a temperature control system shown in FIG. 5A.

Figure 6A:
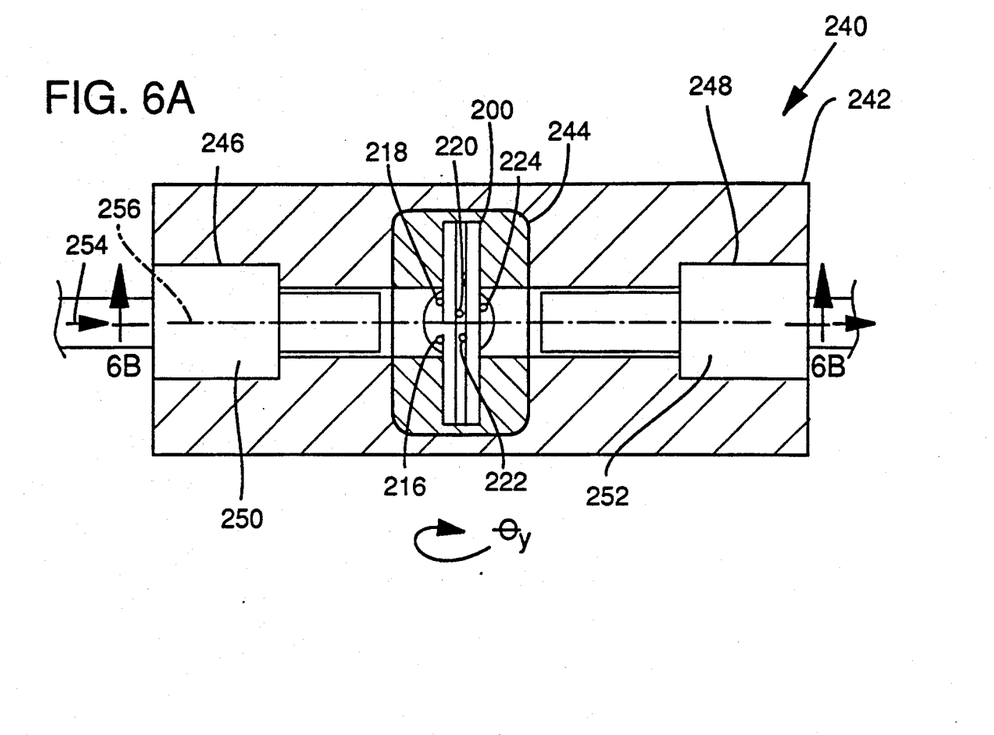
FIGS. 6A and 6B are respective schematic plan and side elevation views of a housing for the temperature control system and liquid crystal attenuator of the present invention.

FIG. 6A is a schematic diagram of a top view of a housing system 240 for temperature control system 200. Housing system 240 includes a casing 242 that is designed to be directly mounted to a circuit board. Casing 242 contains a compartment 244 for housing temperature control system 200, and compartments 246 and 248 for housing lens assemblies 250 and 252 which function to collimate and converge a light beam 254 propagating along an optical axis 256. Optic axis 256 is positioned axially through the center of housing 240.

Figure 6B:
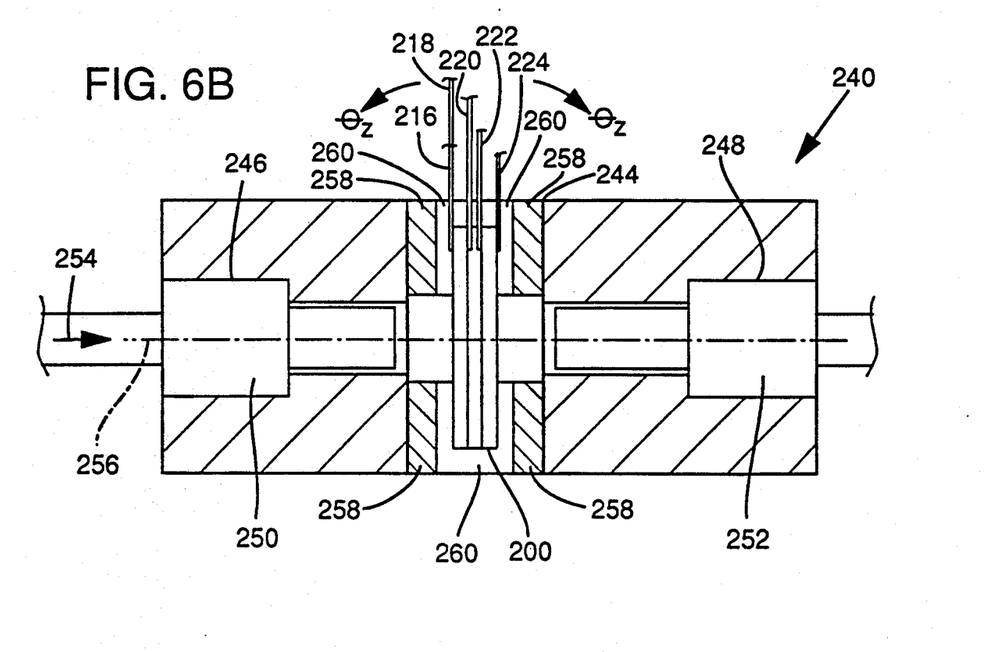

FIG. 6B is a schematic diagram of a side view section of housing system 240. Temperature control system 200 is rigidly secured within compartment 244 of casing 242 by an elastomer frame 258. The elastomer frame 258 allows slight rotations $\theta_y$ and $\theta_z$ of temperature control system 200 to optimize optical performance. The lens assembles 250 and 252 can also be aligned to optimize performance. Potting material 260 is then injected into casing 242 to fix all components into place.

It will be obvious to those having skill in the art that many changes may be made in the above described details of the preferred embodiments of the present invention without departing from the underlying principles thereof. The scope of the present invention should be determined, therefore, only by the following claims.

We claim:

1. In a system including an optical fiber having multiple sections, a liquid crystal optical attenuator for selectively changing the intensity of a light beam propagating along an optical path through the optical fiber, comprising:
   a liquid crystal film disposed between adjacent sections of the optical fiber, the liquid crystal film including liquid crystal material contained within substantially disk-shaped microdroplets having a greater portion of their surface areas disposed generally perpendicularly to the optical path, the liquid crystal material having a molecular orientation in a relaxed state that scatters a large proportion of the light beam out of the optical path;
   retaining means including a tubular housing for retaining the liquid crystal film between the adjacent sections of the optical fiber; and
   field means for generating within the liquid crystal film an electric field of a character that alters the orientation of the liquid crystal material to change its light scattering properties and thereby controllably modulate the intensity of the light beam propagating through the optical fiber.

2. The attenuator of claim 1 in which the liquid crystal film comprises a substantially transparent polymer containing microdroplets of nematic liquid crystal material.

3. The attenuator of claim 2 in which each of the microdroplets and polymer has an index of refraction, and the index of refraction of the microdroplets approaches the index of refraction of the polymer in the presence of an electric field of sufficient magnitude.

4. The attenuator of claim 1 in which the molecules in the liquid crystal material have a random orientation in a relaxed state but align with an electric field of a predetermined magnitude.

5. The attenuator of claim 1 in which the light beam undergoes minimal distortion when propagating through the liquid crystal material.

6. The liquid crystal attenuator of claim 1 in which the electric field is generated in a direction generally parallel to the optical path.

7. The attenuator of claim 1 in which the tubular housing comprises a capillary tube.

8. In a system including an optical fiber having multiple sections, a liquid crystal optical attenuator for selectively changing the intensity of a light beam propagating along an optical path through the optical fiber, comprising:
   a liquid crystal film disposed between adjacent sections of the optical fiber, the liquid crystal film being cured during fabrication of the attenuator and including liquid crystal material having a molecular orientation in a relaxed state that scatters a large proportion of the light beam out of the optical path;
   retaining means for retaining the liquid crystal film between the adjacent sections of the optical fiber to establish the thickness of the liquid crystal film and, during curing of the liquid crystal film, for preventing unpredictable displacement of the adjacent sections of the optical fiber while enabling the liquid crystal film to contract so that oblate-spheroid microdroplets form; and
   field means for generating within the liquid crystal film an electric field of a character that alters the orientation of the liquid crystal material to change its light scattering properties and thereby modulate the intensity of the light beam propagating through the optical fiber.

9. The liquid crystal attenuator of claim 1 in which the liquid crystal film is retained between two optically transparent plates.

10. The liquid crystal attenuator of claim 9 in which the liquid crystal film has first and second major surfaces, the attenuator further comprising:
a collimating lens disposed between a first section of the optical fiber and the first major surface of the liquid crystal film, and
a converging lens disposed between a second section of the optical fiber and the second major surface of the liquid crystal film.

11. In a system including an optical fiber having multiple sections, a liquid crystal optical attenuator for selectively changing the intensity of a light beam propagating along an optical path through the optical fiber, comprising:
a liquid crystal film disposed between adjacent sections of the optical fiber, the liquid crystal film being cured during fabrication of the attenuator and including liquid crystal material having a molecular orientation in a relaxed state that scatters a large proportion of the light beam out of the optical path;
retaining means for retaining the liquid crystal film between the adjacent sections of the optical fiber;
field means for generating within the liquid crystal film an electric field of a character that alters the orientation of the liquid crystal material to change its light scattering properties and thereby modulate the intensity of the light beam propagating through the optical fiber; and
temperature control means for controlling the shape of the microdroplets in the liquid crystal film and thereby stabilizing the switching response time and the dynamic range of attenuation of the attenuator.

12. The attenuator of claim 11 in which the temperature control means includes multiple transparent, independently controllable thermally conductive coatings.

13. A process for making a polarization insensitive liquid crystal attenuator for controlling intensity of a light beam propagating through an optical fiber, comprising the steps of:
mixing at least one polymer precursor, a liquid crystal material, and a refractive index adjusting additive to form a liquid crystal mixture;
depositing the mixture between two surfaces covered with an electrically conductive coating;
curing the mixture so that it polymerizes and forms microdroplets of liquid crystal material; and
immobilizing the surfaces sufficiently during curing so that the mixture forms a liquid crystal film of predetermined thickness and the liquid crystal microdroplets become oblate-spheroid in shape.

14. The process of claim 13 in which the microdroplets comprise substantially liquid crystal.

15. The process of claim 13 in which the step of immobilizing the surfaces sufficiently comprises:
securing sections of the optical fiber to a capillary tube to hold the sections within a predictable location while the mixture polymerizes.

16. The process of claim 15 in which the polymer precursor includes Epon 828, the second polymer precursor includes Capcure 3-800, the liquid crystal material is nematic, and the refractive index adjusting additive includes cyclohexanedimethanol diglycidyl ether.

17. The process of claim 15 in which the step of securing sections further comprises:
applying drops of UV epoxy such that they contact the capillary tube and the sections of the optical fiber, and
curing the UV epoxy for a time period that is less than the full curing time of the epoxy.

18. The attenuator of claim 8 in which the retaining means comprises curable epoxy material applied between sections of the optical fiber and a tubular housing, the epoxy material being only partly cured prior to the curing of the liquid crystal film.

19. The attenuator of claim 8 in which the liquid crystal film comprises a substantially transparent polymer containing microdroplets of nematic liquid crystal such that each of the microdroplets and the polymer has an index of refraction, and the index of refraction of the microdroplets approaches the index of refraction of the polymer in the presence of an electric field of sufficient magnitude.

20. The attenuator of claim 8 in which the light beam undergoes minimal distortion when propagating through the liquid crystal material.

21. The attenuator of claim 8 in which the microdroplets have a greater portion of their surface areas disposed generally perpendicularly to the optical path.

22. The liquid crystal attenuator of claim 11 in which the liquid crystal film has first and second major surfaces, the attenuator further comprising:
a collimating lens disposed between a first section of the optical fiber and the first major surface of the liquid crystal film, and
a converging lens disposed between a second section of the optical fiber and the second major surface of the liquid crystal film.

23. The attenuator of claim 11 in which the retaining means comprises curable epoxy material applied to the sections of the optical fiber and a tubular housing, the epoxy material being only partly cured prior to the curing of the liquid crystal film such that the retaining means determines the thickness of the liquid crystal film and during curing of the liquid crystal film prevents unpredictable displacement of the adjacent sections of the optical fiber while enabling the liquid crystal film to contract so that oblate-spheroid microdroplets form.

* * * * *